United States Patent [19]
Covington et al.
[11] Patent Number: 4,931,192
[45] Date of Patent: Jun. 5, 1990

[54] METHOD FOR THE DISPOSAL OF HAZARDOUS NON-POLAR ORGANIC WASTES

[75] Inventors: J. Stansill Covington; Michael A. McBride, both of Memphis, Tenn.; Michael E. Hayes, Fernandina Beach, Fla.

[73] Assignee: The University of Tennessee Research Corporation, Knoxville, Tenn.

[21] Appl. No.: 327,015

[22] Filed: Mar. 22, 1989

[51] Int. Cl.[5] .......... C02F 11/14; C04B 31/00

[52] U.S. Cl. .......... 210/751; 106/697; 106/724; 106/725; 210/908; 252/631; 405/129; 423/DIG. 20

[58] Field of Search ........ 210/732, 749, 751, 908–911, 210/925; 530/210; 252/8.6, 312, 354, 628, 631; 405/129, 128; 106/170, 174, 239, 90, 94; 208/262.1, 262.5

[56] References Cited

U.S. PATENT DOCUMENTS

| | | | |
|---|---|---|---|
| 3,980,558 | 9/1976 | Thompson | 210/59 |
| 4,124,405 | 11/1978 | Quienot | 106/111 |
| 4,149,968 | 4/1979 | Kupiec | 210/28 |
| 4,230,568 | 10/1980 | Chappell | 210/751 |
| 4,268,395 | 5/1981 | Stewart | 210/749 |
| 4,274,880 | 6/1981 | Chappel | 106/90 |
| 4,312,631 | 1/1982 | Cuntze et al. | 252/8.6 |
| 4,312,675 | 1/1982 | Pickens et al. | 106/174 |
| 4,405,512 | 9/1983 | Filter et al. | 252/628 |
| 4,518,508 | 5/1985 | Conner | 210/911 |
| 4,592,859 | 6/1986 | Smith-Johanssen | 252/309 |
| 4,600,514 | 7/1986 | Conner | 405/129 |
| 4,618,369 | 10/1986 | Smith-Johanssen | 106/95 |
| 4,623,469 | 11/1986 | Conner | 210/751 |
| 4,764,285 | 8/1988 | Robbins et al. | 210/749 |
| 4,812,242 | 3/1989 | James et al. | 210/751 |

FOREIGN PATENT DOCUMENTS

| | | | |
|---|---|---|---|
| 44960 | 2/1982 | European Pat. Off. | 210/751 |
| 126060 | 10/1984 | European Pat. Off. | 252/628 |
| 61803 | 4/1983 | Japan | 210/749 |

*Primary Examiner*—Peter Hruskoci
*Assistant Examiner*—Joseph Drodge
*Attorney, Agent, or Firm*—Luedeka, Hodges and Neely

[57] ABSTRACT

A method for disposing of non-polar organic wastes including the steps of dissolving the organic waste in an organic solvent which is not environmentally objectionable, in combination with a suitable surfactant, mixing the resultant solution with a quantity of water to develop an emulsion in which the organic element is effectively dispersed in the water and thereafter mixing the emulsion with cement which, when allowed to solidify, encapsulates the organic waste within the solid cementitious mass. This solid mass is suitable for disposal in a landfill or the like. This invention is useful in safely disposing of environmentally hazardous organic wastes.

14 Claims, 2 Drawing Sheets

METHOD FOR THE DISPOSAL OF HAZARDOUS NON-POLAR ORGANIC WASTES

This invention relates to the disposal of environmentally hazardous organic waste materials and particularly to the disposal of non-polar (non-water soluble) organic wastes.

Water insoluble organic materials constitute a substantial proportion of the industrial wastes whose disposal is of major concern due to the environmentally hazardous nature of such wastes. For example, hexachlorobenzene, a small molecule produced as a by-product of pesticide manufacture; Lindane, a common insecticide; chlorodibenzofuran, a product produced along with poly-chlorinated biphenyls; and many other such compounds have been generated in the past and/or being produced at the present time. Even though some of these products serve useful purposes at least on a temporary basis, they have now been recognized as representing a significant hazard to the health of our nation. Particularly, these and other such compounds, as waste, have been disposed of heretofore as by placing the compounds in steel drums and then burying the drums in landfills. Time and nature have caused the drums to corrode and leak their contents into the soil and into the ground water.

The current technology for dealing with such hazardous chemicals is environmentally undesirable in two principal areas: the method of putting these chemicals into solutions, and the method of final disposal. The current technology for incorporating these chemicals into solutions relies upon the use of solvents that are chemically similar to the waste chemical. For example, petroleum fractions and halogenated hydrocarbons are the most frequently used solvents. Petroleum fractions are hazardous from the standpoint of explosion danger as well as being poisonous. Halogenated hydrocarbons are poisonous, carcinogenic, and their use is strictly controlled by the Occupational Safety and Health Administration. Neither of these two chemical solvent groups is classified as biodegradable, thus their release in the environment further exacerbates the problem of disposal. Additionally, neither of these two solvent systems is capable of directly incorporating the organic wastes into dispersed aqueous solutions.

A further problem arises when the waste comprises a combination of organics. Single compounds, i.e. Lindane alone, can at times be dealt with using relatively exotic disposal techniques such as high-temperature incineration. On the other hand, single compounds are not as prevalent as are combinations of organic wastes, some of which are amenable to one particular disposal treatment and others of which are not so amenable.

As recognized in the art, "oils", especially non-polar organics interfere with the hydraulic action between water and cement. Thus, in the known prior art involving disposal of hazardous materials by encapsulating non-polar organic waste material in a cementitious solid it has been proposed to absorb the "oil" onto a fly ash or the like and then incorporate this product into a cementitious mass. In this respect, see U.S. Pat. No. 4,274,880. This technique requires handling the "oils" as oils and presents all the usual problems of handling and cleanup associated with such materials. A special problem exists when the oils are toxic or radioactive. Further, this technique provides for only relatively limited quantities of the oils to be included in a given volume of the cementitious products in that lit is required that the oils be absorbed onto the fly ash which takes up considerable volume of the final solid mass. Also, the quantity of oil which can be included is a function of its absorbency by the fly ash. In U.S. Pat. No. 4,230,568 it is recognized that water-immiscible organics cannot be "fully contained" so that in this patent, the inventor proposes adding a cement, fly ash and active carbon to a liquid waste that contains some of an organic contaminant. The carbon appears to serve to absorb or adsorb the organic.

Accordingly, it is an object of the present invention to provide a method for the disposal of organic wastes, and particularly non-polar organic wastes. It is another object of the present invention to provide a method for disposal of combinations of organic wastes, and especially those combinations wherein not all of the organic compounds in the combination are amenable to a single-compound disposal technique. It is another object of the present invention to provide a method for disposal of non-polar organic wastes wherein the wastes are economically isolated in a manner which permits their deposition in a landfill.

Figure 1:
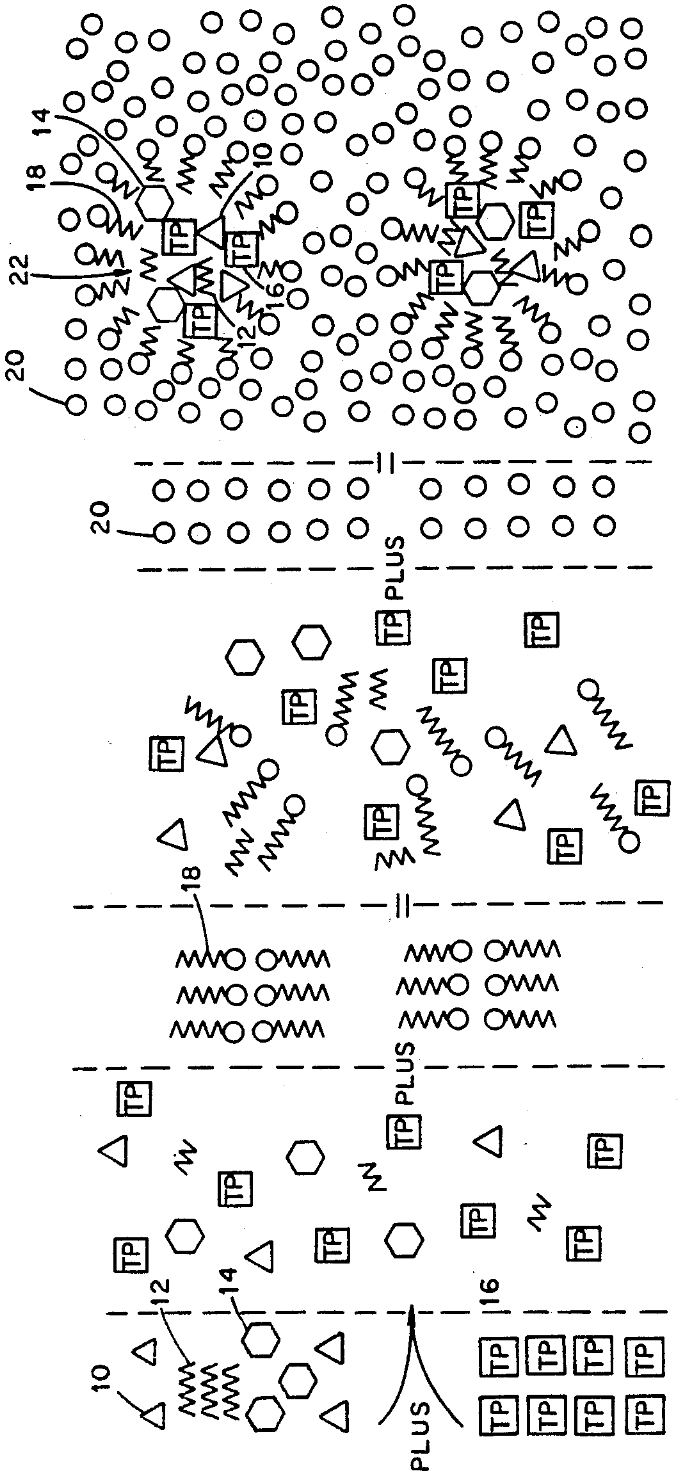
FIG. 1 is a schematic representation of the postulated action of the terpene/terpene emulsifying surfactant upon a mixture of hazardous chemicals and emulsification in water.

In summary, the present method comprises the steps of dissolving the non-polar organic waste (compound) in an organic solvent which is not environmentally objectionable, in combination with a suitable surfactant, mixing the resultant solution with a quantity of water to develop an emulsion in which the organic element is effectively dispersed in the water in the form of small "islands" that are surrounded by water molecules, and thereafter mixing the emulsion with cement which, when allowed to solidify, encapsulates the substantially discrete "islands" of organic waste within the solid cementitious mass. This solid mass has been found to be suitable for disposal in a landfill. Alternatively, the cementitious product (mixed with gravel to produce concrete) may be used as the underbed for roadways, inner bridge piling, or sub-foundation for a building, inasmuch as the strength properties of the concrete product have been found to be substantially equal to like concrete formed with water alone, as opposed to the organic-aqueous mixture disclosed herein.

In the preferred embodiment of the present invention, the first step involves mixing the organic waste, in liquid or semi-liquid form, with a compound from the terpene family. Suitable members of the terpene family include limonene, alpha-pinene, beta-pinene, gamma-terpinene, dipentene, and/or delta-3-carene. Other members of this family may be useful, depending upon the particular organic waste under consideration. Whereas individual members of the terpene family are most commonly used, mixtures of two or more members of the family may provide enhanced dissolution of certain mixtures of organic wastes. Each of the noted members of the terpene family serves as a solvent and is commonly obtained from natural sources such as extraction from orange peels or pine tree products. The nature of the solvent action of this family is broad-based in that heavy oils and greases can be efficiently dissolved with these compounds. Thus, for example, industrial sludges and some solids are treatable. The resulting liquid is essentially insoluble in water. In accordance with the present invention, such liquid is mixed with one or more surfactants. The solution resulting from the addition of the surfactant to the dissolved organic waste has been found to be water emulsifiable and the resultant emulsion has the ability to enter into a variety of reactions in essentially the same way as water, yet remaining unreactive insofar as concerns those components of the solution other than water. While awaiting use in a cementitious mix, the emulsified solution may be held in temporary surface impoundments, i.e. ponds, with minimal evaporation of the hazardous organic component, because of the reduced vapor pressure of such organic. This effective reduction in vapor pressure of the organic also has been found to be beneficial in reducing the tendency of the organic to evaporate when encapsulated within the cementitious mass.

In the present system, the terpene emulsifying surfactants are molecules that are amphipathic in nature in that they can attract the terpene solution with one end of the molecule (the non-polar end) and can attract the water with the other (polar) end. Whereas the method is described herein as including multiple steps for solubilizing the organic and for mixing with the surfactant, it is to be recognized that these steps may be combined, in that the solvent and surfactant may be combined prior to their combination with the organic. Suitable terpene emulsifying surfactants include linear alkyl benzene sulfonates, linear or branched chain alcoholic ethoxylates, polysorbate esters, ethoxylated alkylphenols, and dialkyl succinate compounds. Other suitable surfactants will be recognized by one skilled in the art and given the present disclosure.

The ratio of terpene compounds to terpene emulsifying surfactants is not crucial, and may have wide variance of composition and still perform adequately. A typical composition is 90% of one or more of the terpenes and 10% of the terpene emulsifying surfactant or mixture of surfactants. For example, one mixture of suitable surfactants comprises 6.5% poly (7) ethoxy nonylphenol, 2.1% poly (10) ethoxy nonylphenol, and 1.4% sodium dioctyl sulfosuccinate (thereby making up the 10% of surfactant).

The interaction series of solubilization, addition of the surfactant, and mixing with water can be carried out under a variety of conditions, and elevated temperatures or pressures are not necessary to successfully incorporate the hazardous organic material into the solution. Commonly, when the solution of organic, solvent and surfactant is added to water, it becomes a milky color which is indicative of the dispersal of the hazardous organic. Addition of excess water does not affect the emulsion. It is believed that the organic and terpenes segregate from the water into small spheres with the terpene emulsifying surfactants at the interface, thus causing the organic and terpenes and surfactants to define islands surrounded by water molecules. The repulsion between similar charged islands keeps the islands from coalescing so that the emulsion is stable. It has been found that the emulsion is readily pumpable so that vessels for the emulsion can be readily cleaned by spraying or washing them with water and pumping the residue to another site for mixing with water which can then be used as the feed water for the present method.

With reference to FIG. 1, there is depicted a representation of the mechanism believed to take place in the present method. As shown, a mixture of hazardous organics 10, 12, 14 is solubilized with the terpene 16. Note that various organics may be solubilized simultaneously. Upon the addition of the terpene surfactant 18, followed by mixing with water 20, the organic materials are collected into the islands 22 surrounded by the water molecules, the surfactant molecules being disposed at the interface between the organics and the water molecules.

EXAMPLE I

An example of the use of the present method for incorporation of hazardous organic compounds into a cementitious mass was carried out employing only terpene and a terpene surfactant (TER/TES) mixed with water, plus cement to demonstrate the effect of these ingredients upon the physical and mechanical properties of the cementitious product. In each experiment of this Example, the ratio accepted to produce uniform set cement was taken to be 1.0 ml of water to 6.97 gm of powdered cement. In experiment No. 1, the TER/TES solution was added as additional, but nonreactable, liquid. In experiment No. 2, the TER/TES solution, plus the water, totaled only the precise accepted amount of liquid (i.e. 1.0 ml per 6.97 gm of cement). In all experiments, standard cement cylinders were fabricated, and allowed to set for 96 hours. After that time they were measured using an electronic caliper, and their diametral tensile strength measured using an Instron Universal Testing Machine to determine the effect of the TER/TES (and/or organic component in other Examples) on the physical and mechanical properties of the cementitious mass. The terpene employed in the experiments of Examples I and II was d-limonene. The surfactant employed in the experiments of Examples I and II was a combination of 6.5% poly (7) ethoxy nonylphenol, 2.1% poly (10) ethoxy nonylphenol, and 1.4% sodium dioctyl sulfosuccinate; specifically 90% of the terpene and 10% of the surfactant, all by volume, to provide the TER/TES solution. The results of experiment Nos. 1 & 2 are presented in Table I below:

TABLE I

| Water | Concrete | TER/TES | % TER/TES | Dia. Ten. Strength |
|---|---|---|---|---|
| | | Experiment 1 | | |
| 25 ml | 174.2 g | 0.0 ml | 0% | 298 psi |
| 25 ml | 174.2 g | 1.3 ml | 5% | 275 psi |
| 25 ml | 174.2 g | 2.8 ml | 10% | 213 psi |
| 25 ml | 174.2 g | 4.4 ml | 15% | 183 psi |
| 25 ml | 174.2 g | 6.1 ml | 20% | 198 psi |
| 25 ml | 174.2 g | 8.3 ml | 25% | 203 psi |
| | | Experiment 2 | | |
| 25.00 ml | 174.2 g | 0.00 ml | 0.0% | 296 psi |
| 23.75 ml | 174.2 g | 1.25 ml | 5.0% | 303 psi |
| 22.50 ml | 174.2 g | 2.50 ml | 10.0% | 277 psi |
| 21.25 ml | 174.2 g | 3.75 ml | 15.0% | 362 psi |
| 20.00 ml | 174.2 g | 5.00 ml | 20.0% | 285 psi |
| 18.75 ml | 174.2 g | 6.25 ml | 25.0% | 312 psi |

EXAMPLE II

Figure 2:
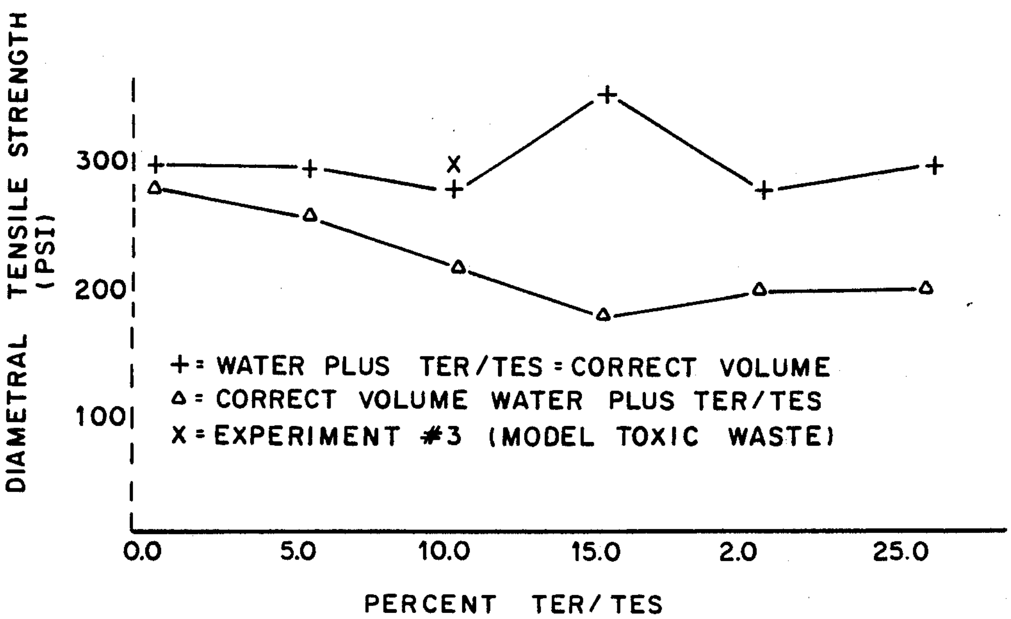
FIG. 2 is a graphic representation of the results of Examples I and II.

In a further example, a model toxic non-polar organic waste composition was formulated from the insecticide hexachlorocyclohexane (Lindane), and the non-polar solvent n-hexane, with motor oil, all in equal parts. This composition is deemed to be representative of a typical reaction by-product mix in the form of a sludge remaining after the desired product has been removed by distillation. Twenty (20%) of this organic composition was mixed with eighty (80%) of d-limonene (72%) and surfactant (8%) solution. The resulting solution was mixed with ninety (90%) water, all by volume. The result was a milky-appearing emulsion which did not substantially settle out upon standing for several days. Any settling was readily reversed by agitation. This final solution was mixed with dry powdered cement using a volume as if water alone was being used, and allowed to set for 96 hours. The results of this Example and the results of experiment Nos. 1 & 2 of Example I are presented in graph form in FIG. 2. From FIG. 2 it can be seen that of the cement products produced with the TER/TES solution and water, the best strengths of the cement product were obtained when the total volume of TER/TES solution and water equaled the target percentage of water alone. Further, the introduction of the organic material to the solution did not detract from the observed tensile strength of the cement product. As may be observed from the results of the present Examples, up to about 25% organic-TER/TES solution, by volume, may be incorporated into the liquid that is added to the cement powder without adversely affecting the physical and/or mechanical properties of the resultant cementitious mass. The results of Examples I and II are depicted graphically in FIG. 2. It will be recognized that in those instances where lessor physical and/or mechanical properties are acceptable, greater volume of the organic-TER/TES solution may be employed.

Further tests of the cement product containing the organic components were conducted to evaluate the tendency of the organic material to leach or otherwise escape from its encapsulation by the solid cementitious mass. In an experiment to confirm the ability of the claimed method to immobilize hazardous organic materials, a model toxic waste solution was created by mixing the following chemicals:

0.2 grams Lindane insecticide
0.1 grams mixed PCBs
20 ml mixed hexanes
20 ml automotive motor oil.

This solution was mixed with 80 ml of such TER/TES solution comprising 90% of d-limonene mixed with 10% of a surfactant comprising 6.5% poly (7) ethoxy nonylphenol, 2.1% poly (10) ethoxy nonylphenol, and 1.4% sodium dioctyl sulfosuccinate. The toxic waste-TER/TES solution was mixed with water in a ratio of 75% water, 25% toxic waste-TER/TES solution. The resulting emulsion was mixed with powdered cement (Portland) using the final solution in the same volume recommended by the manufacturer for water. Specifically 25 ml of the emulsion resulting from the mixing of the water with the toxic waste-TER/TES solution was mixed with 174.2 g of dry cement. Cylinders were poured from the cement mixture, such cylinders measuring 5 cm in height and 3 cm in diameter and allowed to set.

These cylinders were divided into two groups, one group being coated with a commercial concrete sealing material (Thompson's Water Seal, available from Thompson and Formby, Inc. of Memphis, Tenn.) and the other left uncoated. The cylinders were immersed in a laboratory jar containing 250 ml of water and the jar sealed. The samples were subjected to 30 days constant immersion during which time the jar was thermocycled daily between the temperatures of 5° C. and 50° C. At the end of the 30 days, the water in which the samples were immersed was analyzed for Lindane and PCBs. No Lindane nor PCBs were detected in the water containing the coated sample. The water from the uncoated samples was found to contain only one ppb Lindane and 0.8 ppm PCBs. This represents about 0.00025% leakage of the Lindane which is less than ¼ of the permissible quantity of Lindane in drinking water as per the 1978 National Drinking Water Standards.

From the foregoing, it will be evident that radioactive organic wastes may be isolated and prepared for landfill disposal using the present method. Further, whereas reference has been made herein to specific organics, solvents, and surfactants, it is to be recognized that the invention is intended to be limited only as set forth in the claims appended hereto. Specifically, in one embodiment, where the organic is in liquid form and will interact with the surfactant without the use of the solubilizing agent, the solubilizing agent can be dispensed with. Further, the present method is useful in disposal of those organic chemicals that are present as complex mixtures, difficult to detoxify agents, or those compounds that are not otherwise amenable to current disposal techniques. Still further, the present method employs chemical compounds that are naturally derived and generally recognized as safe. The method does not require unusual reaction conditions to immobilize the organic and the resultant cementitious product has substantially the same physical and mechanical properties as ordinary cementitious products. The TER/TES chemicals employed in the present process are essentially non-toxic, biodegradable, non-corrosive, function at room temperature, develop a non-highly flammable solution with the organics, and when combined with water, are non-flammable. The encapsulation of the islands of organics in the resultant cementitious product is complete to the extent that the only practical method to extract the hazardous organic is to grind the mass into a powder and treat it with an appropriate solvent.

In one embodiment of the present invention, contaminated soil containing creosote was admixed with d-limonene and the surfactant employed in Examples I and II (see page 6) with agitation for a period of about 5 minutes. During this time the solvent dissolved the creosote from the soil and upon the halting of the agitation, the soil settled to the bottom of the container. Without continued input of energy into the emulsion, and upon standing, the creosote floated to the top of the liquid. While emulsified this creosote can be disposed of as disclosed herein employing cement. Alternatively, the creosote can be withdrawn from the liquid and disposed of as creosote.

What is claimed:

1. In a method for preparing a hazardous non-polar organic material for disposal in a landfill or other disposal area, the improvement comprising the steps of
   - admixing said non-polar organic material with a solvent therefore and a surfactant to provide a first solution,
   - emulsifying said first solution with water,
   - mixing said emulsion with a sufficient quantity of cement to develop a settable mixture, and
   - thereafter allowing said settable mixture to solidify forming a solidified mass.

2. The method of claim 1 wherein said organic material comprises a mixture of substantially different organic compounds.

3. The method of claim 1 and including the step of dissolving said organic material prior to mixing the same with said surfactant.

4. The method of claim 3 wherein said organic material is dissolved with a solvent selected from the terpene family.

5. The method of claim 4 wherein said organic material is dispersed as discrete islands surrounded by water molecules.

6. The method of claim 1 wherein said organic material is radioactive.

7. The method of claim 1 wherein said organic material comprises chemical waste.

8. The method of claim 1 wherein said emulsion comprises between about 5% and about 35%, by volume, of said first solution and between about 95% and about 65%, by volume, of water.

9. The method of claim 1 wherein said emulsion comprises about 25%, by volume, of said first solution and about 75%, by volume, of water.

10. The method of claim 1 and including the step of coating said solidified mass with a sealant.

11. The method of claim 1 and including the step of introducing to said emulsified liquid solution a polymerizing agent prior to mixing said emulsion with said sufficient quantity of cement.

12. A method for the permanent disposal of environmentally hazardous non-polar organic material in a landfill comprising the steps of dissolving said organic material in a combination of a solvent selected from the terpene family and a terpene emulsifying surfactant to provide a first solution, mixing said first solution with water to provide an emulsion wherein said organic-surfactant mixture is isolated as islands surrounded by water molecules, mixing said emulsion with sufficient dry cement to develop a settable mixture, allowing said settable mixture to solidify, and, thereafter depositing said solidified mass in a landfill or other disposal area.

13. The method of claim 12 wherein said emulsion comprises between about 5% and about 35%, by volume, of said solution and between about 95% and about 65%, by volume, of water.

14. The method of claim 12 wherein said organic material is radioactive.

* * * * *